United States Patent
Mazzagatti et al.

(10) Patent No.: US 7,418,445 B1
(45) Date of Patent: Aug. 26, 2008

(54) METHOD FOR REDUCING THE SCOPE OF THE K NODE CONSTRUCTION LOCK

(75) Inventors: Jane Campbell Mazzagatti, Blue Bell, PA (US); Jane Van Keuren Claar, Bethlehem, PA (US); Steven L. Rajcan, Glenmoore, PA (US)

(73) Assignee: Unisys Corporation, Blue Bell, PA (US)

( * ) Notice: Subject to any disclaimer, the term of this patent is extended or adjusted under 35 U.S.C. 154(b) by 419 days.

(21) Appl. No.: 11/185,627

(22) Filed: Jul. 20, 2005

Related U.S. Application Data

(60) Provisional application No. 60/625,922, filed on Nov. 8, 2004.

(51) Int. Cl.
G06F 17/30 (2006.01)
G06F 7/00 (2006.01)

(52) U.S. Cl. .................... 707/8; 707/102; 707/101

(58) Field of Classification Search ........... 707/102, 707/103 Z, 201; 711/168; 718/102, 106, 718/107, 109; 719/315; 706/46; 717/144
See application file for complete search history.

(56) References Cited

U.S. PATENT DOCUMENTS

| | | | |
|---|---|---|---|
| 4,286,330 A | | 8/1981 | Isaacson |
| 4,823,310 A | * | 4/1989 | Grand .................... 707/8 |
| 5,245,337 A | | 9/1993 | Bugajski |
| 5,293,164 A | | 3/1994 | Bugajski |
| 5,592,667 A | | 1/1997 | Bugajski |
| 5,630,125 A | | 5/1997 | Zellweger |
| 5,634,133 A | | 5/1997 | Kelley |
| 5,829,004 A | | 10/1998 | Au |

(Continued)

FOREIGN PATENT DOCUMENTS

| | | |
|---|---|---|
| EP | 0 079 465 | 1/1985 |
| WO | WO 99/34307 | 7/1999 |
| WO | WO 01/46834 | 6/2001 |
| WO | WO 02/063498 | 8/2002 |

OTHER PUBLICATIONS

Won Kim & Myung Kim, "Performance and Scaleability in Knowledge Engineering: Issues and Solutions", Journal of Object-Oriented Programming, vol. 12, No. 7, pp. 39-43, Nov./Dec. 1999.

(Continued)

*Primary Examiner*—Pierre M. Vital
*Assistant Examiner*—Vei-Chung Liang
(74) *Attorney, Agent, or Firm*—Richard J. Gregson; Robert P. Marley; Susan Murphy

(57) ABSTRACT

A method for recording information in an interlocking trees datastore having a plurality of K paths includes receiving an input particle and building a new K node in accordance with the received input particle. A K node is locked in accordance with the building of the new K node to provide a locked node. The locked node can be the Case node of the new K node. The Case bi-directional link between the locked Case node and the new K node is completed while the locked Case node is locked. A pointer is added to the new K node to an asCase list of the locked Case node. The locked node is locked only while adding the pointer to the new K node to the asCase list of the locked Case node. The locked node can also be a Result node of the new K node.

32 Claims, 14 Drawing Sheets

U.S. PATENT DOCUMENTS

| | | | |
|---|---|---|---|
| 5,894,311 | A | 4/1999 | Jackson |
| 5,918,229 | A | 6/1999 | Davis et al. |
| 5,930,805 | A | 7/1999 | Marquis |
| 5,963,965 | A | 10/1999 | Vogel |
| 5,966,709 | A | 10/1999 | Zhang |
| 5,970,490 | A | 10/1999 | Morgenstern |
| 5,978,794 | A | 11/1999 | Agrawal et al. |
| 5,983,232 | A | 11/1999 | Zhang |
| 6,018,734 | A | 1/2000 | Zhang |
| 6,029,170 | A | 2/2000 | Garger |
| 6,031,993 | A | 2/2000 | Andrews et al. |
| 6,102,958 | A | 8/2000 | Meystel |
| 6,115,715 | A | 9/2000 | Traversat et al. |
| 6,138,115 | A | 10/2000 | Agrawal et al. |
| 6,138,117 | A | 10/2000 | Bayardo |
| 6,144,962 | A | 11/2000 | Weinberg et al. |
| 6,160,549 | A | 12/2000 | Touma et al. |
| 6,233,575 | B1 | 5/2001 | Agrawal et al. |
| 6,275,817 | B1 | 8/2001 | Reed et al. |
| 6,278,987 | B1 | 8/2001 | Reed et al. |
| 6,286,002 | B1 | 9/2001 | Axaopoulos et al. |
| 6,341,281 | B1 | 1/2002 | MacNicol et al. |
| 6,356,902 | B1 | 3/2002 | Tan et al. |
| 6,360,224 | B1 | 3/2002 | Chickering |
| 6,373,484 | B1 | 4/2002 | Orell et al. |
| 6,381,600 | B1 | 4/2002 | Lau |
| 6,389,406 | B1 | 5/2002 | Reed et al. |
| 6,394,263 | B1 | 5/2002 | McCrory |
| 6,453,314 | B1 | 9/2002 | Chan et al. |
| 6,470,277 | B1 | 10/2002 | Chin et al. |
| 6,470,344 | B1 | 10/2002 | Kothuri et al. |
| 6,473,757 | B1 | 10/2002 | Garofalakis et al. |
| 6,477,683 | B1 | 11/2002 | Killian et al. |
| 6,499,026 | B1 | 12/2002 | Rivette et al. |
| 6,505,184 | B1 | 1/2003 | Reed et al. |
| 6,505,205 | B1 | 1/2003 | Kothuri et al. |
| 6,581,063 | B1 | 6/2003 | Kirkman |
| 6,591,272 | B1 | 7/2003 | Williams |
| 6,604,114 | B1 | 8/2003 | Toong et al. |
| 6,615,202 | B1 | 9/2003 | Ding et al. |
| 6,624,762 | B1 | 9/2003 | End, III |
| 6,635,089 | B1 | 10/2003 | Burkett et al. |
| 6,662,185 | B1 | 12/2003 | Stark et al. |
| 6,681,225 | B1 | 1/2004 | Uceda-Sosa et al. |
| 6,684,207 | B1 | 1/2004 | Greenfield et al. |
| 6,691,109 | B2 | 2/2004 | Bjornson et al. |
| 6,704,729 | B1 | 3/2004 | Klein et al. |
| 6,711,585 | B1 | 3/2004 | Copperman et al. |
| 6,738,762 | B1* | 5/2004 | Chen et al. ............ 707/3 |
| 6,745,194 | B2 | 6/2004 | Burrows |
| 6,748,378 | B1 | 6/2004 | Lavender et al. |
| 6,751,622 | B1 | 6/2004 | Puri et al. |
| 6,760,720 | B1 | 7/2004 | De Bellis |
| 6,768,995 | B2 | 7/2004 | Their et al. |
| 6,769,124 | B1 | 7/2004 | Schoening et al. |
| 6,799,184 | B2 | 9/2004 | Bhatt et al. |
| 6,804,688 | B2 | 10/2004 | Kobayashi et al. |
| 6,807,541 | B2 | 10/2004 | Bender et al. |
| 6,816,856 | B2 | 11/2004 | Baskins et al. |
| 6,826,556 | B1 | 11/2004 | Miller et al. |
| 6,831,668 | B2 | 12/2004 | Cras et al. |
| 6,868,414 | B2 | 3/2005 | Khanna et al. |
| 6,900,807 | B1 | 5/2005 | Liongosari et al. |
| 6,920,608 | B1 | 7/2005 | Davis |
| 6,931,401 | B2 | 8/2005 | Gibson et al. |
| 6,938,204 | B1* | 8/2005 | Hind et al. ............ 715/515 |
| 6,952,736 | B1 | 10/2005 | Westbrook |
| 6,965,892 | B1 | 11/2005 | Uceda-Sosa et al. |
| 7,027,052 | B1 | 4/2006 | Thorn et al. |
| 7,228,296 | B2 | 6/2007 | Matsude |
| 2002/0120598 | A1* | 8/2002 | Shadmon et al. ............ 707/1 |
| 2002/0124003 | A1 | 9/2002 | Rajasekaran et al. |
| 2002/0138353 | A1 | 9/2002 | Schreiber et al. |
| 2002/0143735 | A1 | 10/2002 | Ayi et al. |
| 2002/0143783 | A1 | 10/2002 | Bakalash et al. |
| 2002/0188613 | A1 | 12/2002 | Chakraborty et al. |
| 2002/0194173 | A1 | 12/2002 | Bjornson et al. |
| 2003/0009443 | A1 | 1/2003 | Yatviskly |
| 2003/0033279 | A1 | 2/2003 | Gibson et al. |
| 2003/0093424 | A1 | 5/2003 | Chun et al. |
| 2003/0115176 | A1 | 6/2003 | Bobroff et al. |
| 2003/0120651 | A1 | 6/2003 | Bernstein et al. |
| 2003/0200213 | A1* | 10/2003 | Charlot et al. ............ 707/8 |
| 2003/0204513 | A1 | 10/2003 | Bumbulis |
| 2003/0204515 | A1 | 10/2003 | Shadmon et al. |
| 2003/0217335 | A1 | 11/2003 | Chung et al. |
| 2004/0107186 | A1 | 6/2004 | Najork et al. |
| 2004/0133590 | A1 | 7/2004 | Henderson et al. |
| 2004/0143571 | A1 | 7/2004 | Bjornson et al. |
| 2004/0169654 | A1 | 9/2004 | Walker et al. |
| 2004/0230560 | A1 | 11/2004 | Elza et al. |
| 2004/0249781 | A1 | 12/2004 | Anderson |
| 2005/0015383 | A1 | 1/2005 | Harjanto |
| 2005/0050054 | A1 | 3/2005 | Clark et al. |
| 2005/0060325 | A1 | 3/2005 | Bakalash et al. |
| 2005/0071370 | A1 | 3/2005 | Atschul et al. |
| 2005/0080800 | A1 | 4/2005 | Parupudi et al. |
| 2005/0097108 | A1 | 5/2005 | Wang et al. |
| 2005/0102294 | A1 | 5/2005 | Coldewey |
| 2005/0149503 | A1 | 7/2005 | Raghavachari |
| 2005/0171960 | A1 | 8/2005 | Lomet |
| 2005/0179684 | A1 | 8/2005 | Wallace |
| 2005/0198042 | A1 | 9/2005 | Russell et al. |
| 2005/0262108 | A1 | 11/2005 | Gupta |
| 2007/0150474 | A1* | 6/2007 | Szilagyi et al. ............ 707/8 |

OTHER PUBLICATIONS

Jeffrey O. Kephart & David M. Chess, "The Vision of Autonomic Computing", T.J. Watson Research Jan. 2003.

Linda Dailey Paulson, "Computer System, Heal Thyself", Aug. 2003.

Dave Gussow, "Headline: IBM-Enterprise Storage Server Shines at Colgate Palmolive", Jan. 6, 2003.

Caroline Humer, "IBM Creates Self-Healing Computer Unit", Jan. 8, 2003.

Burton F. W. et al:"Multiple Generation Text Files Using Overlaping Tree Structures", Computer Journal, Oxford University Press, Surrey, GB. vol. 28, No. 4 Aug. 1985, pp. 414-416.

* cited by examiner

METHOD FOR REDUCING THE SCOPE OF THE K NODE CONSTRUCTION LOCK

CROSS-REFERENCE TO RELATED CASES

This application claims the benefit of U.S. Provisional Application No. 60/625,922 filed Nov. 8, 2004.

BACKGROUND OF THE INVENTION

1. Field of Invention

This invention relates to the field of building new structure in an interlocking trees datastore.

2. Description of Related Art

In many applications it is useful to identify when data or input sequences that have not been previously encountered, i.e. new variables or records, are received into a datastore. In known systems identifying a new sequence has required the very computationally intensive procedure of comparing the new sequence with all of the previously received to search for a match. In another known procedure for identifying new sequences a table of the distinct values was constructed for comparison. Therefore, more efficient methods for detecting a new sequence are required.

Additionally, when a new sequence is identified the rules for the construction of a particular interlocking trees datastore may require building a new node or nodes to record the new sequence. When a new node is being built care should be taken to prevent access to nodes being changed, for example, by another thread executing in the datastore. Therefore, nodes that are being changed should be locked until the changes are complete in order to prevent such an access. In known systems the entire interlocking trees datastore was locked from threads adding new sequences to prevent other threads from accessing changing nodes. This was a severe restriction because it slowed the system down and essentially limited the construction of interlocking trees datastore to a single thread.

All references cited herein are incorporated herein by reference in their entireties.

BRIEF SUMMARY OF THE INVENTION

A method for recording information in an interlocking trees datastore having a plurality of K paths includes receiving an input particle to provide a received input particle and building a new K node in accordance with the received input particle. A K node is locked in accordance with the building of the new K node to provide a locked node. The locked node can be the Case node of the new K node. The Case bi-directional link between the locked Case node and the new K node is completed while the locked Case node is locked. A pointer is added to the new K node to an asCase list of the locked Case node. The locked node is locked only while adding the pointer to the new K node to the asCase list of the locked Case node. The locked node can be a Result node of the new K node. A pointer is added to the new K node to an asResult list of the locked Result node while the Result node is locked. The Result node is locked only while adding the pointer to the new K node to the asResult list of the locked Result node. A memory location of a Case node and a memory location of a Result node is associated with the new K node. The locked node is locked after the associating of the memory locations with the new K node. The locked node can be the Case node and the new K node is added to the asCase list of the locked Case node while the locked Case node is locked.

As a part of its regular processing of streams of input particles the KStore engine recognizes that a sequence being processed is 'new' when there is no existing structure to record the sequence being processed. This condition may occur at any level in the K structure. At this point it is possible to implement many different processes to deal with the new sequence at substantially low incremental cost.

For example, new K structure may be created to record the event, an error statement may be issued, the event may be logged, processes may be initiated to evaluate the new sequence in accordance with some established criteria, or any combination of processes may be initiated in response to encountering new sequence.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The invention will be illustrated in more detail with reference to the following examples, but it should be understood that the present invention is not deemed to be limited thereto.

Figure 1:
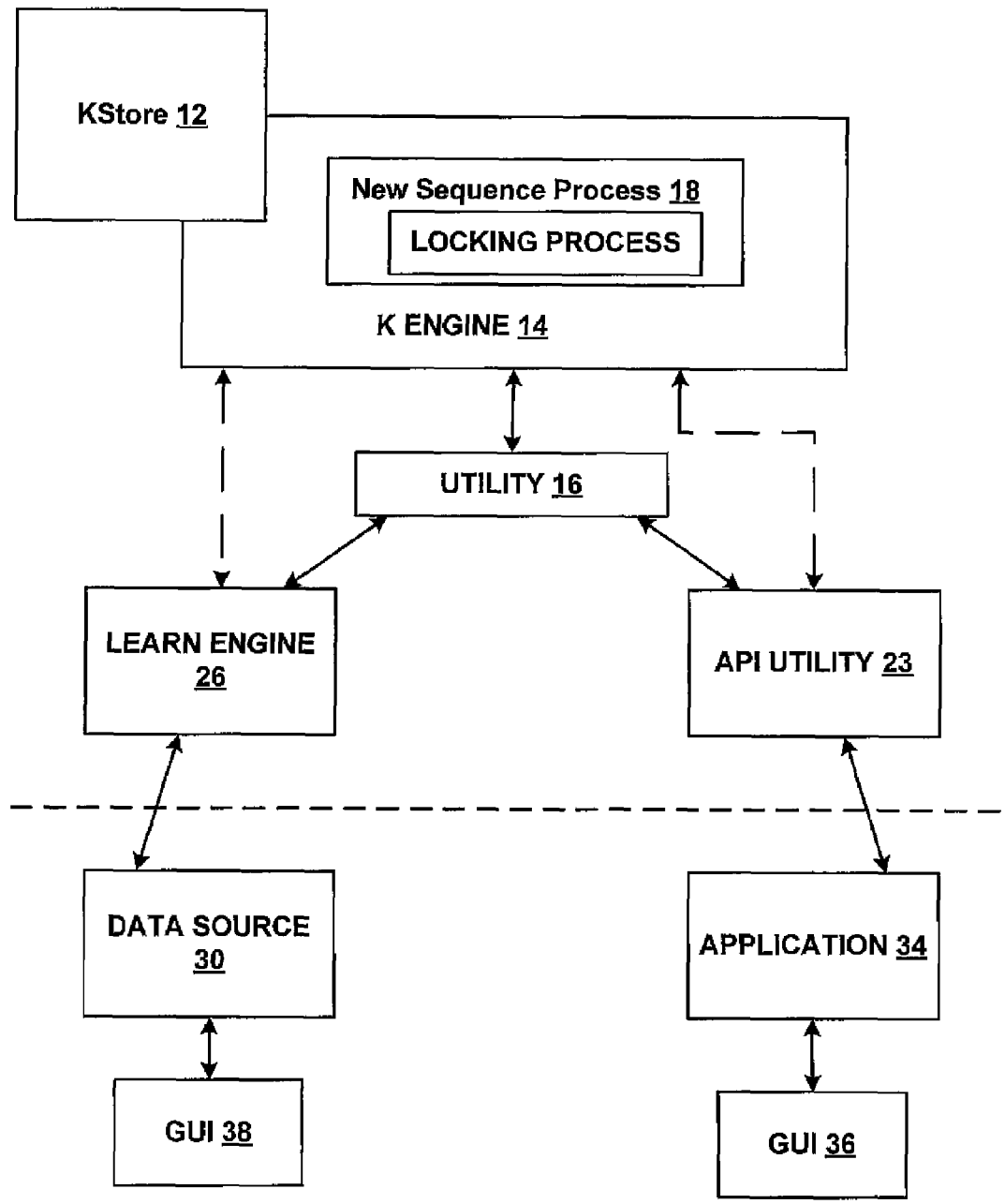
FIG. 1 shows a block diagram representation of a KStore environment in which the system and method of the present invention can be implemented.

Referring now to FIG. 1, there is shown a block diagram representation of a KStore environment in which the system and method of the present invention may be implemented. Within the KStore environment information, may flow bi-directionally between the KStore 12 and both a data source 30 and an application 34 by way of a K Engine 14, as understood by those skilled in the art. The transmission of information between the data source 30 and the K Engine 14 may be by way of a learn engine 26, and the transmission of information between the application 34 and the K Engine 14 may be by way of an API utility 23, as also understood by those skilled in the art. The data source 30 and the application 34 may be provided with graphical user interfaces 36, 38 to permit a user to communicate with the system.

Additionally, according to the system and method of the invention, the K Engine 14 can be provided with a new sequence process 18 to permit the processing of new sequences as described in detail herein below. For example, one of the processes that are related to the new sequence process 18 is the lock process for locking previously existing nodes when a new node is constructed. The performance of the new sequence process 18 may be facilitated by providing specialized utilities 16. In the preferred embodiment of the invention the learn engine 26 and the API utility 23 can communicate with the K Engine 14 both directly and by way of the utilities 16.

Referring now to FIGS. 2A-E, there are shown the minimal KStore structure 100 and a plurality of elements identified by reference numerals 130-160 which demonstrate a means of creating the minimal KStore structure. The minimal KStore structure 100 is the smallest KStore possible. It includes a single K path, beginning with K node 102 and ending with K node 112, wherein a portion of the K path ending with K node 112 is a portion of triad 114 having a subcomponent node 106. The minimal KStore structure 100 also includes an end product node 112 with its end of thought (EOT) root node 126. The nodes 106, 112 and 126 form a KStore triad.

In order to build the minimal KStore structure 100 the subcomponent K node 106 can be created by establishing the Case and Result bi-directional links. The Case bi-directional link 104 between the primary root node 102 and the K node 106, as best seen in the datastore element 130 of FIG. 2B. A pointer to node 102 becomes the Case entry of node 106 and the asCase list of the primary root node 102 is updated to include a pointer to the subcomponent node 106.

The Result bi-directional link 120 is established between the elemental root K node 122 and the K node 106. A pointer to node 122 becomes the Result entry of node 106 and the asResult list of the elemental root node 122 is updated to include the subcomponent node 106. It will be understood that the foregoing operations for building a subcomponent node such as the subcomponent node 106 can be described in any order for illustrative purpose and can be performed in any order when practicing the present invention.

Figure 2A:
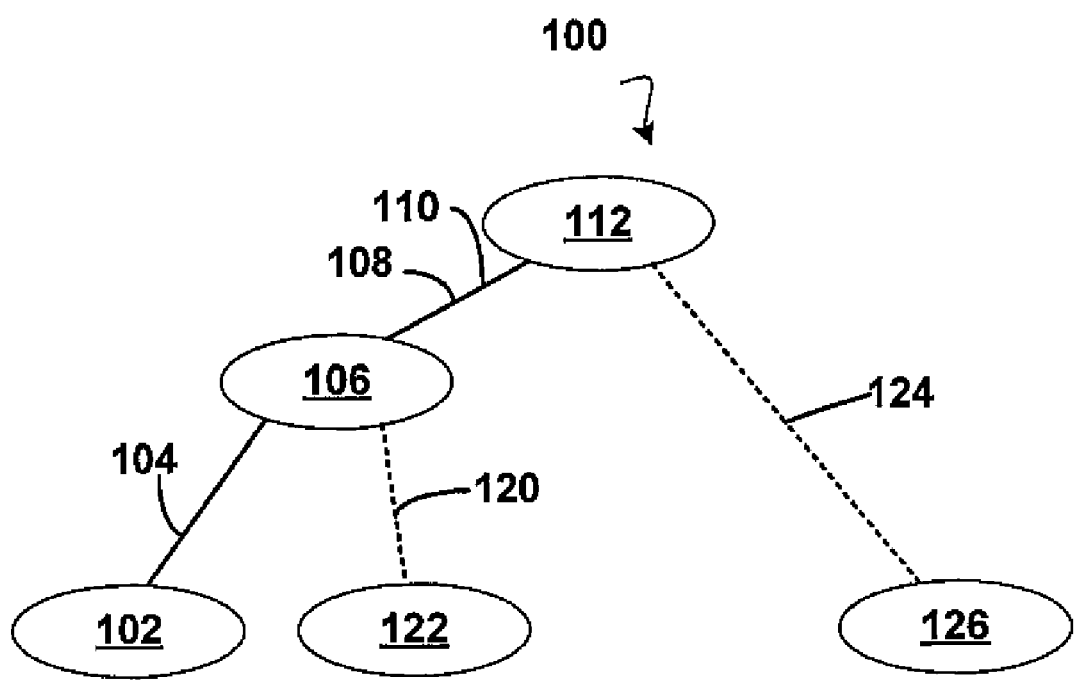
FIG. 2A shows a minimal KStore structure.
Figure 2B:
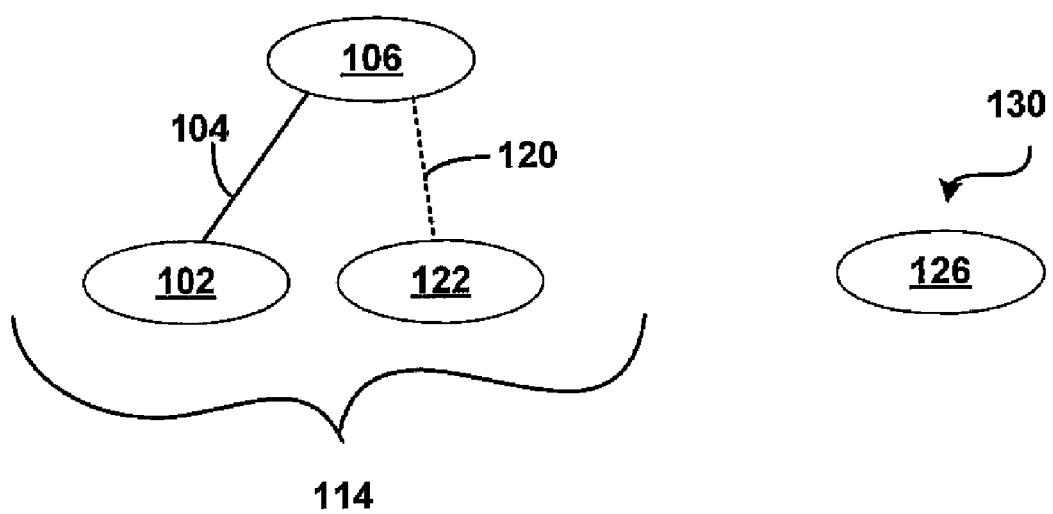
FIGS. 2B-E shows a series of datastore elements that may be formed in the process of building the minimal KStore structure of FIG. 2A.
Figure 2C:
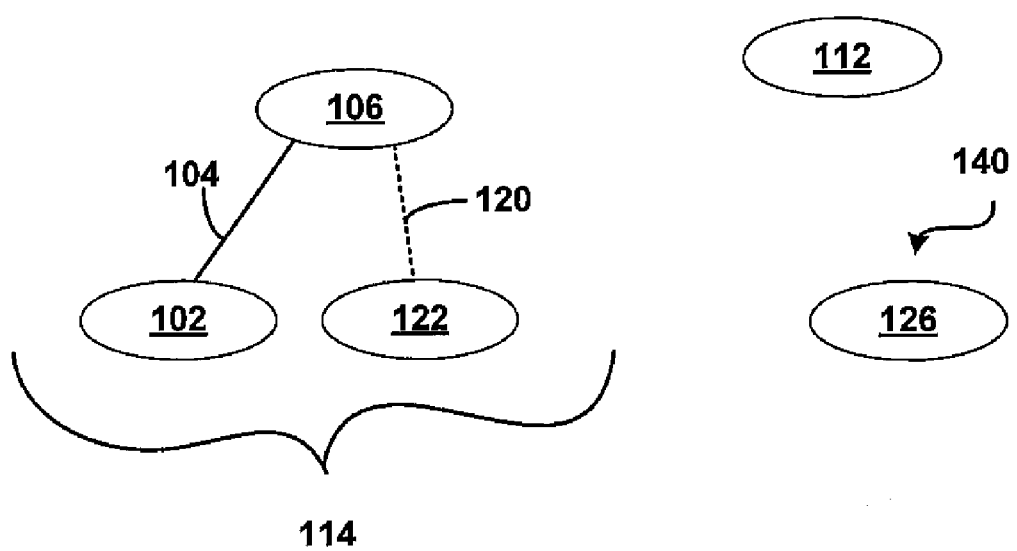
Figure 2D:
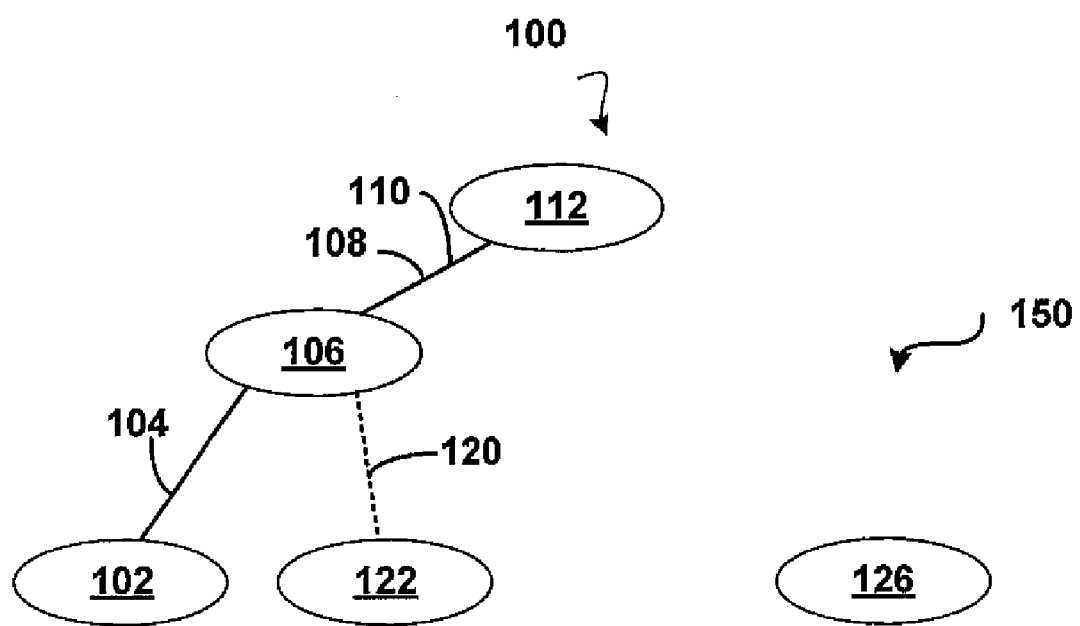
Figure 2E:
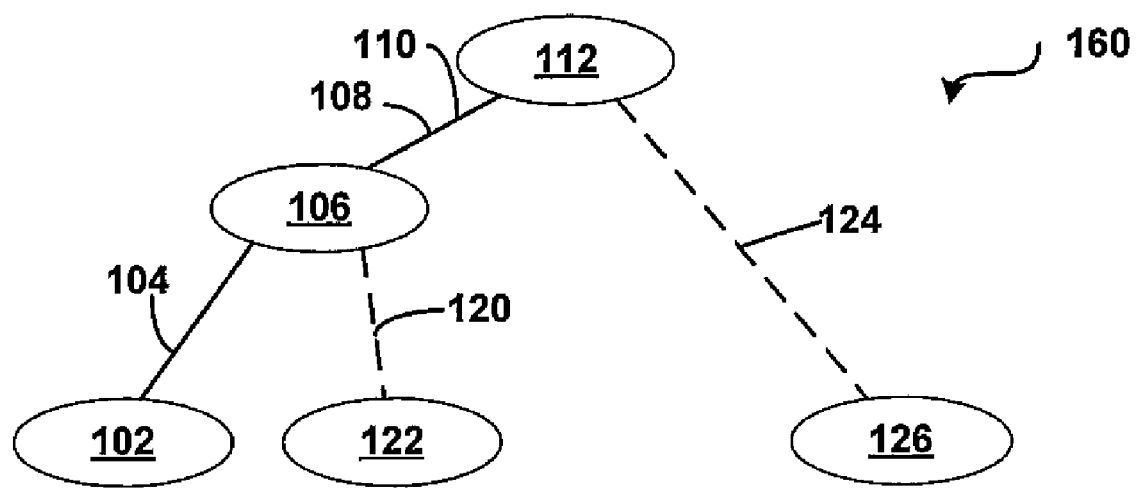

The Case bi-directional link 110 can then be established between the end product node 112 and the subcomponent node 106, as best seen in the datastore elements 140, 150 of FIGS. 2C, D. By establishing the bi-directional link 124 between the end product node 112 and the EOT node 126, the datastore element 150 is completed, as best seen in the datastore elements 160 of FIG. 2E. It will be understood that the datastore element 160 has substantially the same structure as the minimal KStore structure 100. Thus, the datastore elements 130-160 illustrate possible stages in the process of building the minimal KStore structure 100. The building process shown by the datastore elements 130-160 can be continued indefinitely to create a triadic continuum of any size. The building of interlocking trees datastores such as the minimal KStore structure 100 is taught in more detail in U.S. patent application Ser. Nos. 10/385,421, 10/666,382 and 10/759, 466.

Figure 2F:
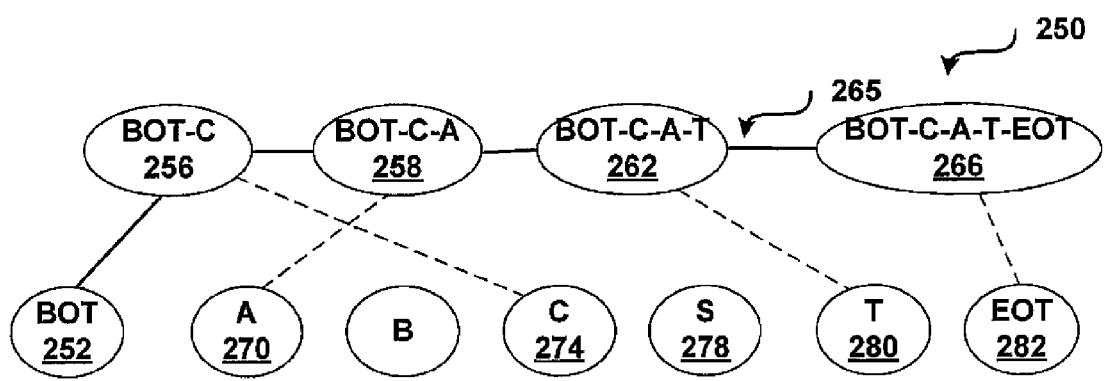
FIGS. 2F,G show interlocking trees datastores that may be used to represent data according to the system and method of the present invention.

Referring now to FIGS. 2F, G, there are shown the interlocking trees datastore 250 and the interlocking trees datastore 290. The interlocking trees datastore 250 provides a representation of the sequence C-A-T. The sequence of letter data particles required for representing the sequence C-A-T can be streamed into the interlocking trees datastore 250 using a data simulator or by using any other method of entering input into a KStore. When the letter particle C of the sequence C-A-T is received the BOT-C node 256 can be built by establishing the Case bi-directional link to the beginning of thought (BOT) node 252 and establishing the Result bi-directional link to the C root node 274. Thus, the BOT-C node 256 can be built in substantially the manner previously described with respect to the nodes 106 of the triad 114 within the minimal KStore structure 100. The BOT-C node 256 is then designated as the current K location within the structure for this particular thread.

When the letter particle A of the sequence C-A-T is received the BOT-C-A node 258 can be built into the interlocking trees datastore 250 by establishing the Case bi-directional link to the BOT-C node 256. The Result bi-directional link to the A root node 270 can then be established. Thus, the BOT-C-A node 258 is built in response to receiving the letter particle A. The BOT-C-A node 258 is then designated as the current K location.

In order to form the BOT-C-A-T node 262 when the T letter particle is received the Case bi-directional link can be established to the BOT-C-A node 258 and the Result bi-directional link can be established to the T root node 280. The end product node 266 can then be created by forming the Case bi-directional link to the BOT-C-A-T node 262 and the Result bi-directional link to the EOT node 282. In this manner the K path 265 of the interlocking trees datastore 250 is built for representing the sequence of letter particles within the string C-A-T. With the processing of an EOT node the current K location is set to BOT.

In one preferred embodiment a count can be kept within each node of the interlocking trees datastore 250 in order to keep track of the number of times the node is traversed. The counts of the nodes within a K path of an interlocking trees datastore may be incremented each time they are encountered during later traversals of the K path. Thus, it will be understood that in alternate embodiments of the system and method of the invention the counts of the individual nodes of an interlocking trees datastore such as the interlocking trees datastore 250 can be incremented either as they are built, encountered or when the building and traversal is complete.

Figure 5:
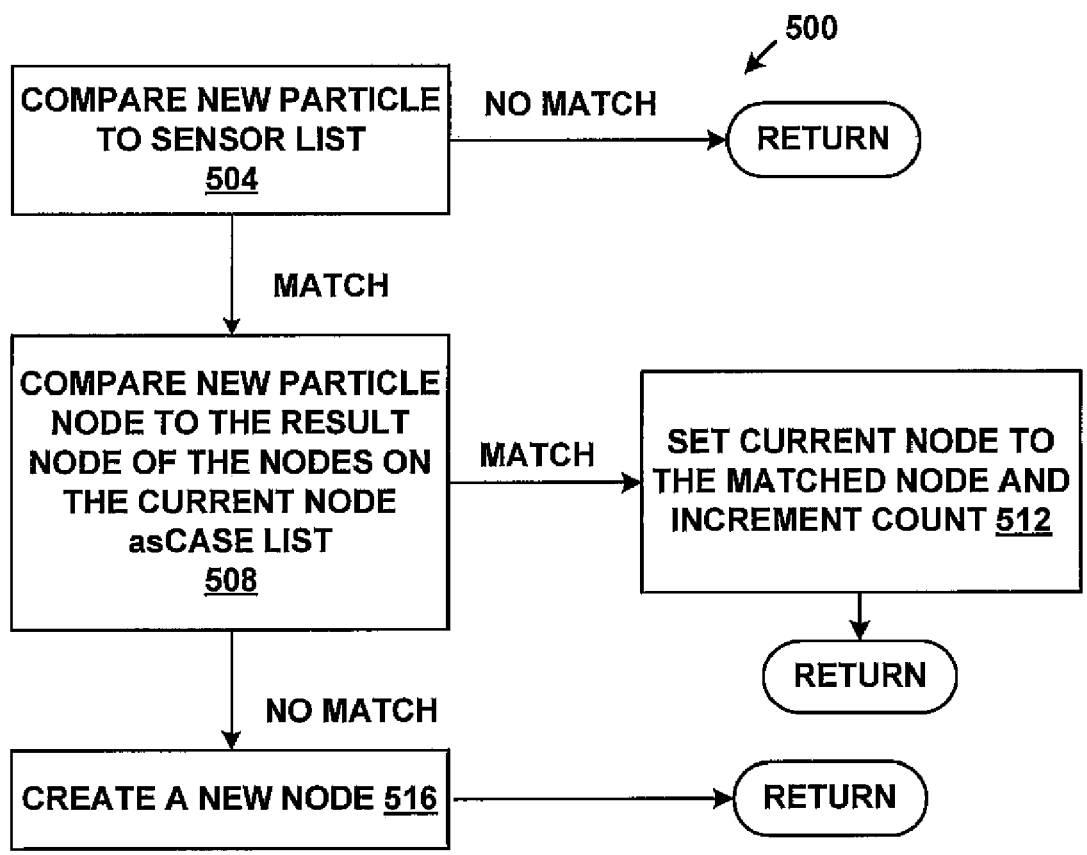
FIG. 5 shows a preferred embodiment of a process for detecting a new sequence in an interlocking trees datastore such as the interlocking trees datastores of FIGS. 2F, G.

Referring now to FIG. 5, there is shown the new sequence determining procedure 500 for determining when a new sequence is received by an interlocking trees datastore such as the interlocking trees datastores 250, 290. In the new sequence determining procedure 500 an input particle is compared to the list of the sensors of the interlocking trees datastore 250, 290, as shown in block 504. If no match is found in block 504 the particle is ignored and execution returns from the new sequence determining procedure 500. If a match is found the root node corresponding to the particle is thereby located.

If a match is found in block 504 the particle is considered valid. The asCase list of the current K location node is obtained. A comparison is then performed between the Result node of each node in the asCase list and the root node of the input particle. The comparison between the nodes on the asCase list of the current node and the particle root node is shown in block 508. If there is a match in the comparison of block 508 the matched node becomes the current K location node as shown block 512. The count of the new current K location node and the input particle root node may be incremented at this time or may be incremented along with the other nodes in its K path when an end product node is encountered. If there is no match in the comparison of block 508 a new node may be created as shown in block 516 of new sequence determining procedure 500.

Figure 3:
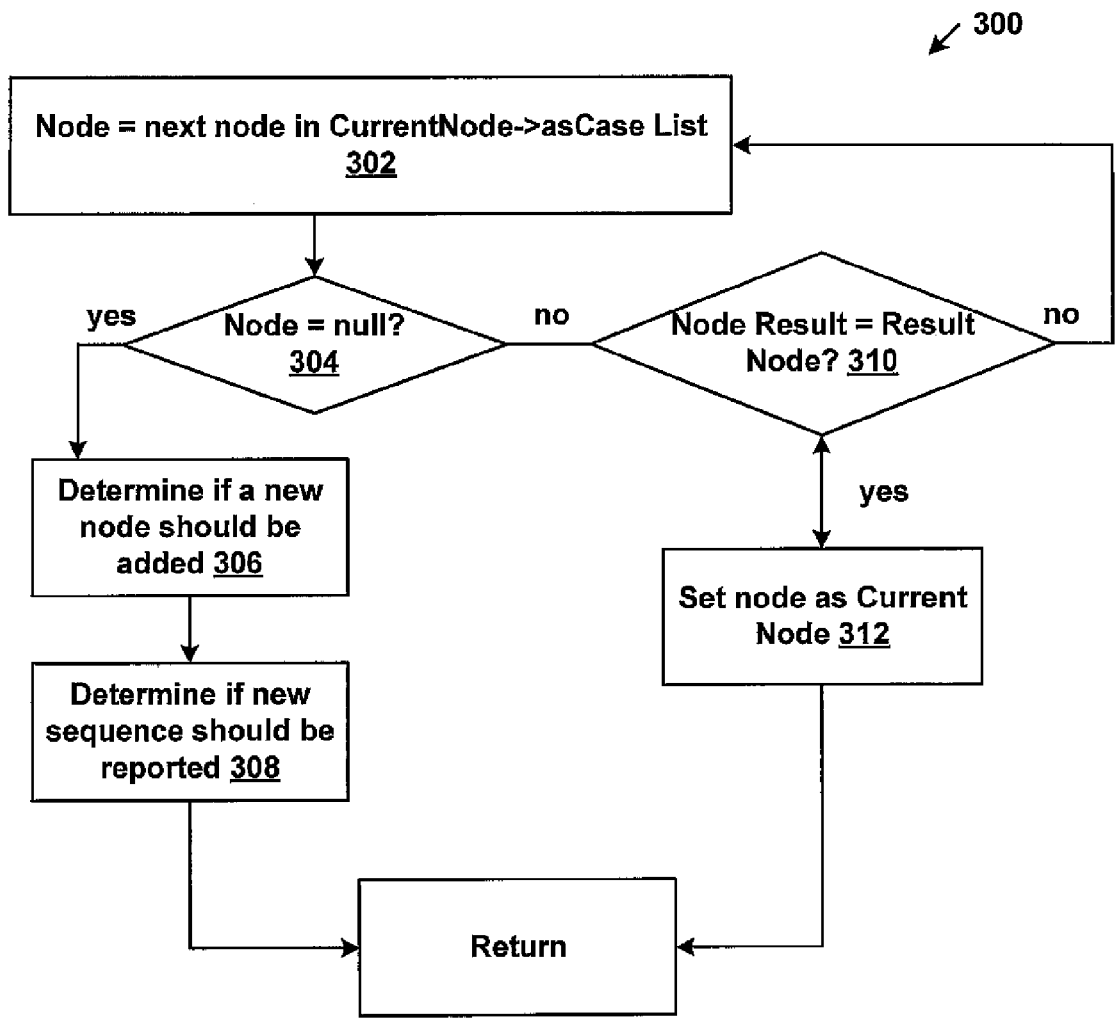
FIG. 3 shows a preferred embodiment of the next node process for processing particles in an interlocking trees datastore such as the interlocking trees datastores of FIGS. 2E, F.

Referring now to FIG. 3, there is shown a more detailed diagram of boxes 508, 512, and 516 from FIG. 5. The next node processing procedure 300 is a procedure for locating the path indicated by the next K node to be processed. For example, the next node processing in a Kstore procedure 300 can be used to process nodes representing particles or nodes representing complete thoughts within the interlocking trees datastore 250.

Although the particles set forth herein are input letter particles, it will be understood that the system and method of the invention can apply to any type of particle processing within an interlocking trees datastore. For example, they can apply to input words, sentences, pixels, molecules, amino acids, or any other data that can be received and stored in a datastore.

It will be understood by those skilled in the art that during its next node processing operations the next node particle processing procedure 300 will inherently detect the occurrence of a new sequence by the absence of structure to record an event within the interlocking trees datastore 250. This feature of the next node processing procedure 300 eliminates the need for any additional operations, beyond the normal input processing procedures, to determine when a new sequence is received. When a new sequence is determined within a KStore by the next node processing procedure 300 new KStore structure may be built to represent the new sequence. It will be understood that, the next node processing procedure 300 and any other process set forth herein, may be applied to a single level KStore such as the interlocking trees datastore 25 as well as any level of a multi-level KStore and to any other KStore.

Furthermore, the next node particle processing procedure 300 may be used in building new structure when it determines that a new sequence has arrived. For example, the particle next node procedure 300 may be applied to processing the sequence C-A-T-S within the interlocking trees datastore 250 to create the interlocking trees datastore 290.

When the sequence of letter data particles required for representing the sequence C-A-T-S is streamed into the KEngine for interlocking trees datastore 250 there is already structure within the interlocking trees datastore for the sequence. This structure was previously created for the C-A-T input sequence. The next node processing procedure 300 may thus begin by traversing the existing structure starting at the BOT node and possibly incrementing the count fields in the nodes encountered during the traversal. When the letter particle C of the sequence C-A-T-S is received, the current K location node is BOT and the asCase list of the BOT root node 252 may be followed to the BOT-C node 256. Since the Result node of the BOT-C node 256 (the C root node 274) matches the input letter particle C, traversal can continue. The C root node 274 is defined as a non-adjacent node of the BOT-C node 256 since it is not on the asCase list of the BOT-C node 256. At this point the count of the BOT node 252, the BOT-C node 256, and the C root node 274 can be incremented.

When the letter particle A of the sequence C-A-T-S is received execution of the next node processing procedure 300 can proceed to block 302. The next node processing procedure 300 may then make a determination whether the Result pointer of any subcomponent node in the asCase list of the BOT-C node 256 points to the A root node 270.

The only node in the asCase list of the BOT-C node 256 is the BOT-C-A node 258. Therefore, the current K location node is set to point to the BOT-C-A node 258 in block 302. Since Node is thus not null as determined in decision 304, a determination is made in decision 310 whether the Result pointer of the BOT-C-A node 258 points to the A root node 270.

Since a match is found in this determination the count of the BOT-C-A node 258 and the Root Node 270 may be incremented. The BOT-C-A node 258 is then made the current K location node in block 312. In this manner the next node processing procedure 300 can process the input stream. No new structure has been built within the interlocking trees datastore 250 thus far since the BOT-C-A node 258 of the sequence C-A-T-S was already formed when the sequence C-A-T was previously received.

When the letter particle T of the sequence C-A-T-S is received, the asCase pointer of the BOT-C-A node 258 can be followed to the BOT-C-A-T node 262 and the Result list of the BOT-C-A-T node 262 can be followed to the T node 280 and another match is found. Again, no new structure is built within the interlocking trees datastore 250. Thus, the next node processing procedure 300 has traversed the interlocking trees datastore 250 incrementing the counts of the nodes encountered as the input particles C-A-T of the sequence C-A-T-S were received.

However, when the letter particle S is received it will be determined by the next node procedure 300 that the structure for representing the sequence C-A-T-S does not exist within the interlocking trees datastore 250. Accordingly, when block 302 is executed the BOT-C-A-T-EOT node 266 is located using the asCase list of the BOT-C-A-T node 262 and the BOT-C-A-T-EOT node 266 is assigned to the variable Node in block 302. Execution of the next node processing procedure 300 proceeds to decision 310 by way of decision 304 since the BOT-C-A-T-EOT node 266 is not null. When the determination of decision 310 is made execution returns to block 302, since there is no match between the received letter particle S and the EOT node 282 indicated by the Result pointer of the BOT-C-A-T-EOT node 266.

Since there are no more nodes in the asCase list of the BOT-C-A-T node 262 the determination whether Node is null is affirmative the next time decision 304 is encountered. It will be understood that the affirmative determination in decision 304 indicates that the interlocking trees datastore 250 does not include a K path representing the sequence C-A-T-S. Therefore, the sequence C-A-T-S has not been previously entered into the interlocking trees datastore 250, and it may be determined that the sequence C-A-T-S is a new sequence at this point.

It will thus be appreciated by those skilled in the art that using a procedure such as the next node processing procedure 300 the system and method of the present invention may input sequences, and inherently and simultaneously determine the occurrence of a new sequence as part of the normal process of receiving the sequences. There is no need to perform any separate comparisons or any other operations in addition to the processing of the input stream in order to detect the need for new structure since the detection of need for new structure is inherent in decision 304 as part of the process.

In response to the determination in decision 304 that Node is null and that new sequence has been encountered or captured, a determination can be made in block 306 whether a new node should be built in the interlocking trees datastore 250. Additionally, a determination can be made whether the occurrence of the new sequence should be reported to the user, administrator, log, etc. of the system and method of the present invention in block 308.

The determinations of blocks 306, 308 may be made according to predetermined rules or administrative guidelines or any other set of protocols. The parameters of the guidelines or protocols can be communicated to the next node processing procedure 300 by a calling procedure, a GUI or any other source. The rules or administrative guidelines can be set up by a user or administrator or any other party. For example, the user or administrator or other party can adapt the system and method of the invention to ignore the detection of new structure made in decision 304 and do nothing. Under these guidelines the occurrence of the new sequence can be treated substantially as noise.

Another possibility is to adapt the next node processing procedure 300 to build no new structure when a new sequence is detected or captured, but to report the occurrence to the user or administrator. The reporting can be done through the KEngine 14 or it can be performed by passing information to a calling procedure such as the learn engine 26 or the API utilities 23. Additionally, reporting can be done by way of an email. The reports can be used, for example, to trigger events such as the starting of another process, a new field event or a new record event, to set flags, to log messages, to send information or reports to a graphical user interface (GUI) 36, to send emails to a list of recipients or to perform any other operations. Additionally, the GUI 36 can report the occurrence to the user or administrator and permit the user to determine how to handle it. If a new node is built in view of the determination of block 306 the guidelines may or may not require providing a report.

When a report is made according to block 308 it may contain any information that may prove useful. For example, the value represented by the current node at the time that the new sequence was determined in decision 304 can be reported. The identity of the newly received particle can be reported. A list of possible next nodes obtained in block 302 of the particle processing procedure 300 according to the asCase list of the current node can be reported. It is also possible to anticipate the next node by making an estimate of which of the possible next nodes obtained in block 302 is the most likely next node. For example, the most likely next node may be determined by comparing the counts of the possible next nodes. The determination of the mostly likely next node can also be made according to how recently the possible next nodes have been accessed or according to the context in which the determination is made. In another embodiment the determination can be determined based upon processing a further node/particle or nodes/particles.

Figure 2G:
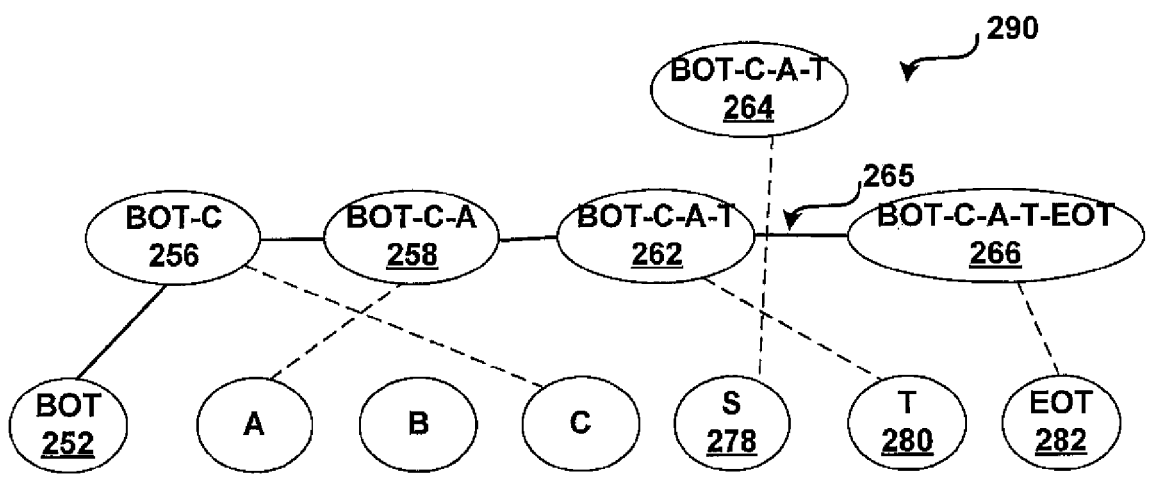

Referring again to FIG. 2G, there is shown the interlocking trees datastore 290. The interlocking trees datastore 290 may be built as a result of the next node processing procedure 300 operating on the letter particle S of the sequence C-A-T-S in the interlocking trees datastore 250. This may occur when: i) there is an affirmative determination in decision 304, thereby indicating that a new sequence has been determined, and ii) the protocol of block 306 requires the building of a new node when such a new sequence is determined.

In order to form the BOT-C-A-T-S node 264 the Case bi-directional link may be established to the BOT-C-A-T node 262 by the routine for creating new nodes called in block 306. A Result bi-directional link may be established to the S root node 278. Thus, a branch is created in the path 265 of the interlocking trees datastore 290 at the BOT-C-A-T node 262 to provide the new K path 263.

Figure 4A:
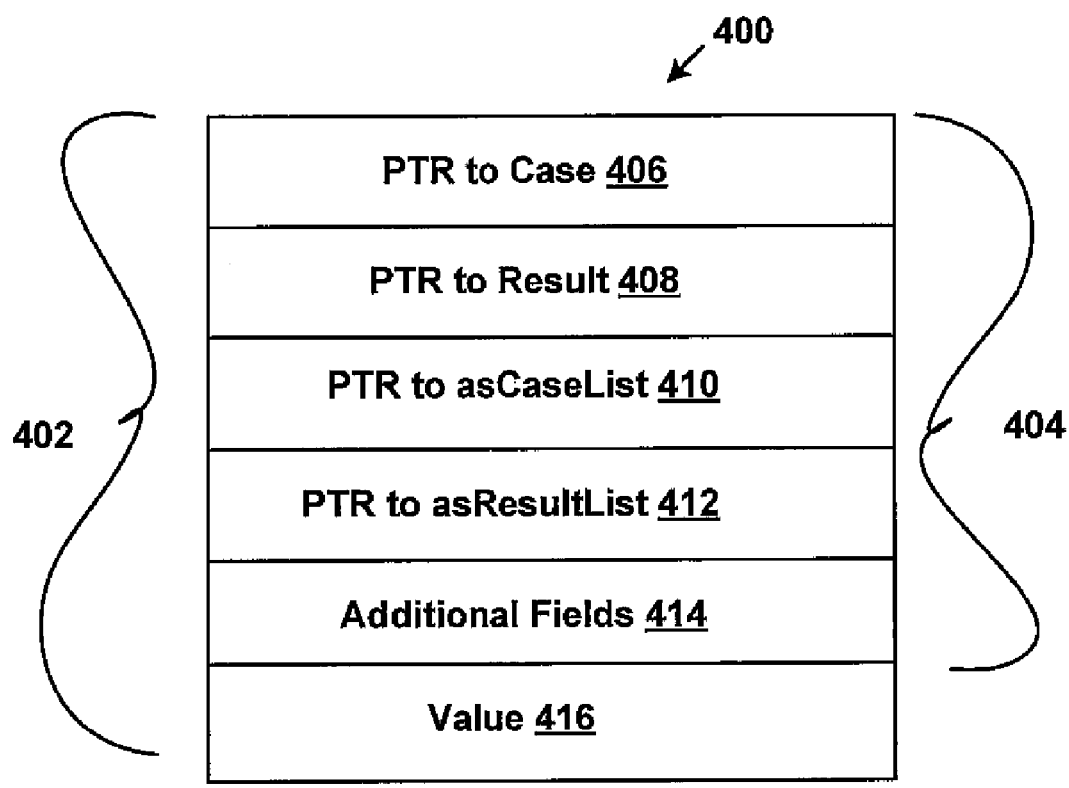
FIGS. 4A, B show exemplary nodes within an interlocking trees datastore such as the interlocking trees datastores of FIGS. 2F, G.

Referring now to FIG. 4A, there is shown the exemplary node 400 of an interlocking trees datastore such as the interlocking trees datastores 250, 290. The exemplary node 400 can be an exemplary elemental root node 402 or an exemplary subcomponent node 404 or end product node 404. When a new node is built in an interlocking datastore memory is allocated for the new node in the manner shown in the exemplary node 400. A plurality of pointers can then be stored in the allocated memory. The new node is defined by setting the Case pointer to point to the previous node and setting the Result pointer to point to the root node. Thus, for example, if the exemplary subcomponent node 404 represents the subcomponent node 264 of the interlocking trees datastores 290, the Case pointer 406 would point to the subcomponent node 262.

The exemplary node 400 can also include a Result pointer 408. Thus, when the exemplary node 400 represents the subcomponent node 264 of the interlocking trees datastore 290, the Result pointer 408 would point to the S root node 278.

A pointer to asCase list 410 can also be included in the exemplary node 400. The pointer to asCase list 410 is a pointer to a list of the subcomponent nodes or end product nodes for which the node represented by the exemplary node 400 is the Case node. The pointer to asResult list 412 is a pointer to a list of the subcomponents nodes or end product nodes for which the node represented by the exemplary node 400 is the Result node. The nodes of the interlocking trees datastores 250, 290 can also include one or more additional fields 414. The additional fields 414 may be used for an intensity or count associated with the node or for any number of different items associated with the structure. Another example of a parameter that can be stored in an additional field 416 is the particle value for an elemental root node.

Figure 4B:
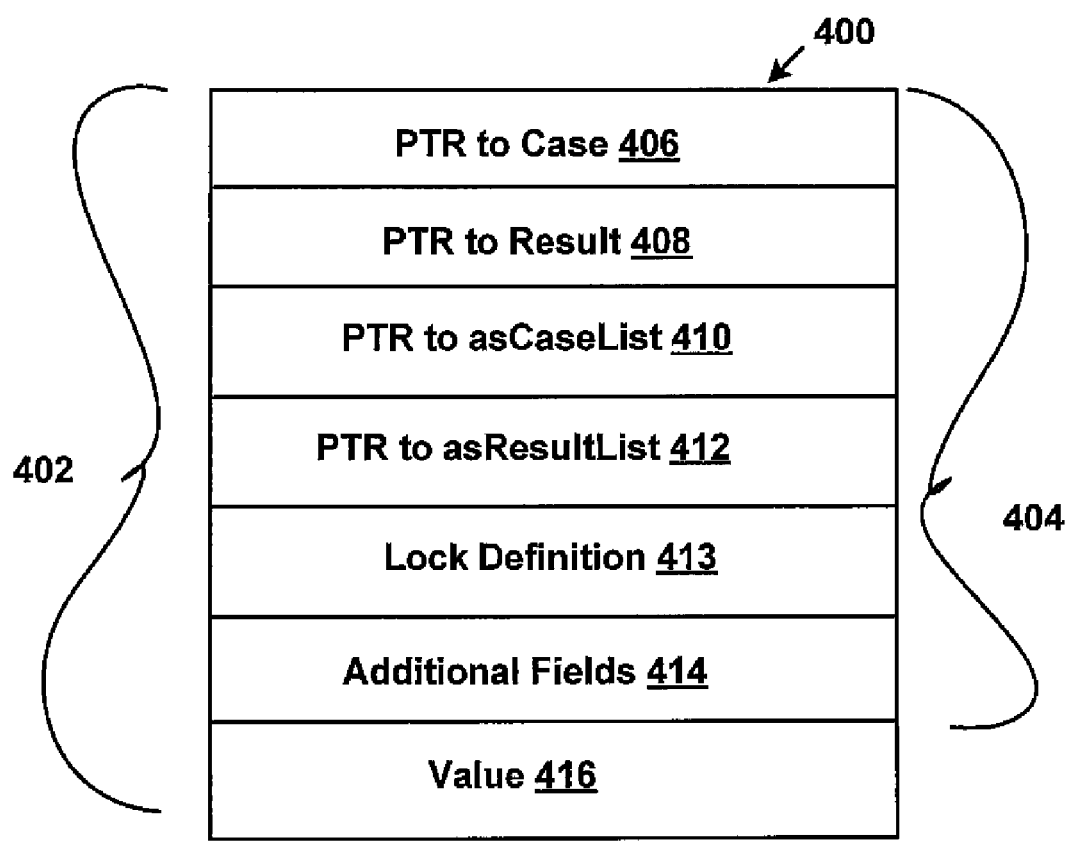

Referring now to FIG. 4B, there is shown the exemplary node 450. The exemplary node 450 is an alternate embodiment of the exemplary node 400. The exemplary node 450 includes the Case pointer 406, the Result pointer 408, the pointer to asCase list 410, the pointer to asResult list 412, the additional fields 414 and the value field 416 as previously described with respect to the exemplary node 400. Additionally, the exemplary node 450 includes the lock definition field 413. A lock definition within the lock definition field 413 can be set and reset in order to indicate whether the node represented by the exemplary node 450 is locked or unlocked to prevent the node from being accessed while it is being changed. Thus, the lock definition field 413 of a node should be checked prior to accessing any nodes in an interlocking trees datastore in order to prevent any attempts to access a locked node. However, in one preferred embodiment the writing of information to nodes is not permitted without checking the lock definition field 413 while the reading of nodes without checking can be permitted. In another alternate embodiment of the invention the lock definition may be stored at another location rather than within the exemplary node 400.

Figure 6:
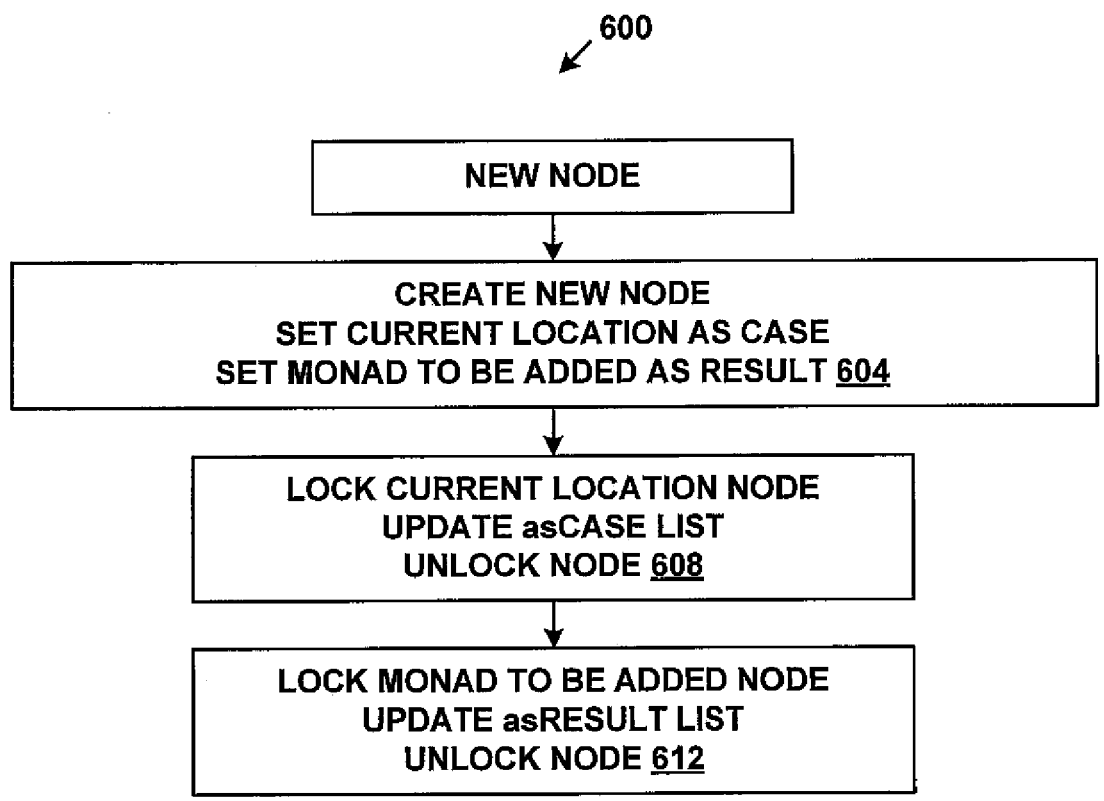
FIG. 6 shows a preferred embodiment of a process for creating a new node in an interlocking trees datastore such as the interlocking trees datastores of FIGS. 2F, G.

Referring now to FIG. 6, there is shown the node locking procedure 600 used when building a new node within the interlocking trees datastores 250, 290. As previously described, care should be taken to prevent access to a node which is being changed by, for example, another thread executing in a datastore. Therefore, nodes that are linked to new nodes may be locked while their asCase list, asResult list, count field or some other field in the node is updated in order to prevent such an access.

In the node locking procedure 600 a new node is created as shown in block 604. The new node can be created as previously described with respect to FIGS. 2A-E. Memory for the new node is allocated as shown in the exemplary node 400 and the fields of the exemplary node 450 are populated. Block 604 also shows that the current K location node is the Case node of the newly created node. Therefore, the location of the current K location node can be stored in the Case pointer field 406 of the new node. A pointer to the location of the root node is stored in the Result pointer field 408. No locking is required while this new node is being constructed.

Additionally, the asCase list of the current K location node may be updated to include the newly created node as shown in block 608. Therefore, the current K location node may be locked while its asCase list is updated and unlocked after the asCase list is updated. In a preferred embodiment all list updating operations are performed with the node being locked and immediately updated and unlocked in this manner in order to minimize the lock time.

Furthermore, no other nodes are locked by this thread during the period that the current node is locked. Thus, it is an important feature of the present invention that only one node at a time is locked by a particular thread, as described in more detail below. In a preferred embodiment, the current K location node may be locked and unlocked by setting and resetting the lock definition in the lock definition field 413 of the exemplary node 400 of the current K location node at the beginning and at the end of the operation of block 608.

Additionally, the asResult list of the root node may be updated by the node locking procedure 600 to include the newly created node. Therefore, as shown in block 612 the root node is locked and its asResult list is updated. The root node to be added may then be unlocked. In a preferred embodiment of the invention the root node is locked by the node locking procedure 600 only during the time it takes to update its asResult list.

During the time that the pointers of the exemplary node 400 for the new node are being established there are no pointers pointing to the new node. Therefore, no nodes can access the new node and there is no need to lock the new node. Furthermore, there is no need to lock either the Case node or the Result node while the new node is being established since their data is not changing during this period.

When the pointers of the new node are established the asCase list of the Case node and the asResult list of the root node may be updated one at a time so that only one or the other of the two are locked. Therefore, a very important feature of the system and method of the present invention is that only one node is locked at a time for this thread. All of the remaining nodes in the interlocking trees datastores 250, 290 may remain unlocked. This reduces the scope of the node locking to the minimum amount possible and permits faster operation of the interlocking trees datastore 250, 290.

Figure 7:
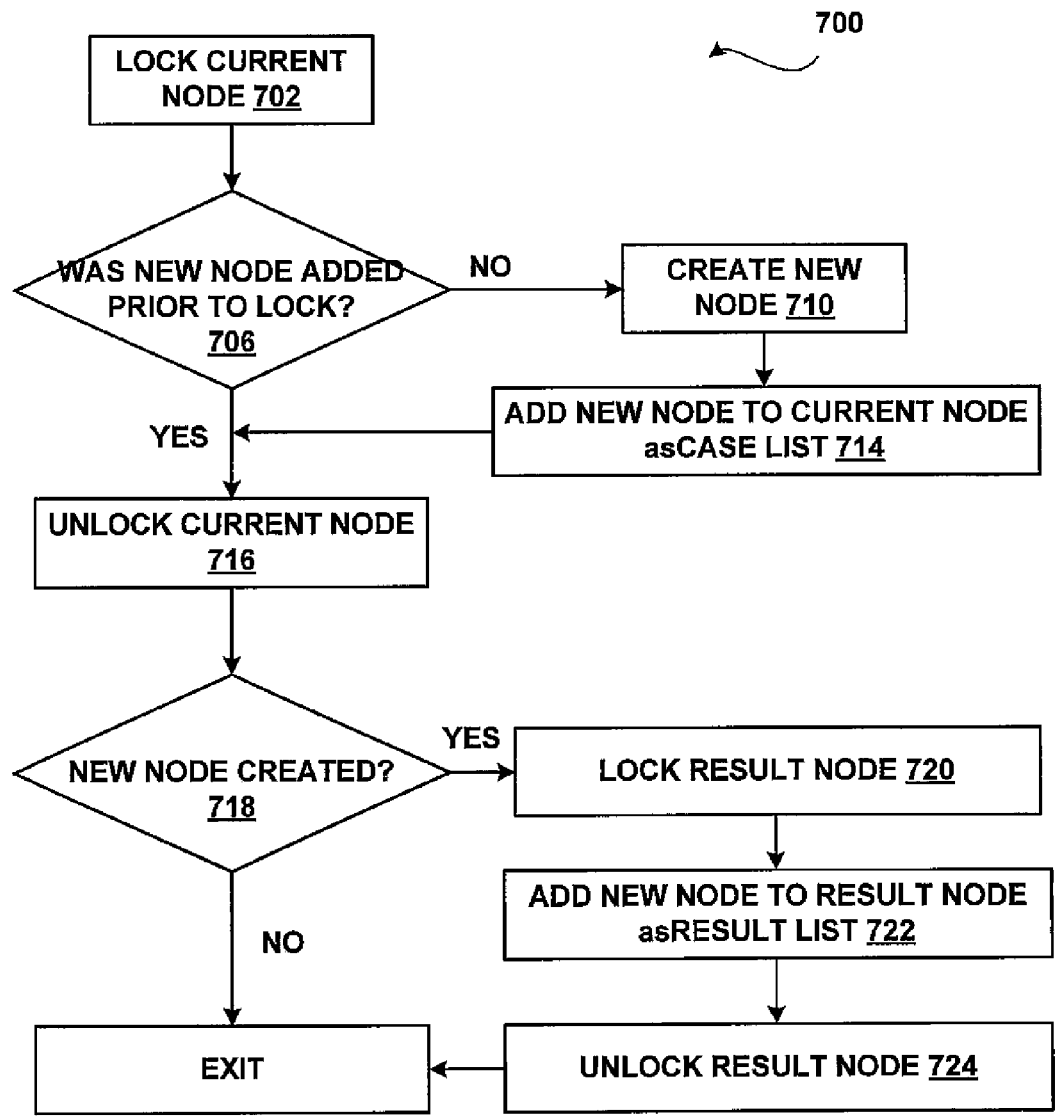
FIG. 7 shows a preferred embodiment of a process for creating a new node in an interlocking trees datastore such as the interlocking trees datastores of FIGS. 2F, G

Referring now to FIG. 7, there is shown the node locking procedure 700 for preventing access to nodes which are involved in the construction of a new node in an interlocking trees datastore 250, 290. Within the node locking procedure 700 the current node is locked by a thread as shown in block 702 by setting the lock flag in its lock definition field 413.

A determination is then made in decision 706 whether the new node has been added prior to the locking operations of block 702. This determination should be made in the node locking procedure 700 since it is possible for a thread other than the instant thread to begin building the new node between the time that the instant thread determines that the new node must be built and the time that the current node is actually locked according to block 702. The determination of decision 706 can be made by checking the asCase list of the current node.

If the new node has not been added during the foregoing time period as determined in decision 706 of the node locking procedure 700, the new node may be created as shown in block 710. Since the current node was locked in block 702 a pointer to the new node can be added to the asCase list of the current node at this time as shown in block 714. Regardless of whether a new node is created in block 710 the current node is unlocked as shown in block 716.

If a new node was created in block 710 as determined in decision 718, the root node for the new node is locked as shown in block 720. A pointer to the new node is added to the asResult list of the root node as shown in block 722. The root node can then be unlocked as shown in block 724. Thus, within the node locking procedure 700 only one node is locked at a time.

While the invention has been described in detail and with reference to specific examples thereof, it will be apparent to one skilled in the art that various changes and modifications can be made therein without departing from the spirit and scope thereof.

What is claimed is:

1. A method executed at least in part on a computer for recording information in an interlocking trees datastore having a plurality of K paths, comprising:

receiving an input particle to provide a received input particle;

recording said received input particle into said interlocking trees datastore by building a new K node to record said received input particle in said interlocking trees datastore, said interlocking trees datastore comprising root nodes and non-root nodes organized into a plurality of connected K paths, wherein the new K node of the interlocking trees datastore comprises a first pointer comprising a Case pointer pointing to a previous node, a second pointer comprising a Result pointer pointing to an elemental root node, a third pointer comprising an asCase List pointer pointing to a list of the subcomponent nodes or end product nodes for which the new K node is the Case node and a fourth pointer comprising an asResult List pointer pointing to a list of subcomponent nodes or end product nodes for which the new K node is the Result node, the plurality of connected K paths of the interlocking trees datastore comprising a first K path of a first tree of the interlocking trees datastore, the first K path comprising a primary root node linked to a subcomponent node with a first Case link, the subcomponent node linked to an end product node with a second Case link, and a second K path of a second tree of the interlocking trees datastore comprising an elemental root node linked to the subcomponent node with a Result link, such that a pointer to the elemental root node comprises the result entry of the subcomponent node and an asResult list of the elemental root node is updated to include the subcomponent node; and locking a K node in accordance with said building of said new K node to provide a locked node.

2. The method for recording information in an interlocking trees datastore of claim 1, wherein said locked node comprises a Case node of said new K node.

3. The method for recording information in an interlocking trees datastore of claim 2, further comprising completing a Case bi-directional link between said locked Case node and said new K node while said locked Case node is locked.

4. The method for recording information in an interlocking trees datastore of claim 3, further comprising adding a pointer to said new K node to an asCase list of said locked Case node.

5. The method for recording information in an interlocking trees datastore of claim 4, further comprising locking said locked node only while adding said pointer to the new K node to said asCase list of said locked Case node.

6. The method for recording information in an interlocking trees datastore of claim 1, wherein said locked node comprises a Result node of said new K node.

7. The method for recording information in an interlocking trees datastore of claim 6, further comprising adding a pointer to said new K node to an asResult list of said locked Result node while said Result node is locked.

8. The method for recording information in an interlocking trees datastore of claim 7, further comprising locking said locked Result node only while adding said pointer to the new K node to said asResult list of said locked Result node.

9. The method for recording information in an interlocking trees datastore of claim 1, further comprising associating a memory location of a Case node and a memory location of a Result node with said new K node.

10. The method for recording information in an interlocking trees datastore of claim 9, further comprising locking said locked node after said associating of said memory locations with said new K node.

11. The method for recording information in an interlocking trees datastore of claim 10, wherein said locked node is said Case node further comprising adding said new K node to the asCase list of said locked Case node while said locked Case node is locked.

12. The method for recording information in an interlocking trees datastore of claim 11, further comprising:
 locking said Result node after locking said locked Case node; and
 adding said new K node to the asResult list of said locked Result node while said locked Result node is locked.

13. The method for recording information in an interlocking trees datastore of claim 11, further comprising:
 locking said Result node before locking said Case node; and
 adding said new K node to the asResult list of said locked Result node while said locked Result node is locked.

14. The method for recording information in an interlocking trees datastore of claim 11, further comprising:
 locking said Result node while said Case node is locked; and
 adding said new K node to the asCase list of said locked node while said Case node is locked.

15. The method for recording information in an interlocking trees datastore of claim 1, wherein said new K node has a new node count further comprising initializing said new node count.

16. The method for recording information in an interlocking trees datastore of claim 1, further comprising building said new K node in accordance with a determination that a new sequence has been encountered.

17. A computing system having a programmable processor and an attached medium capable of storing encoded data for recording information in an interlocking trees datastore having a plurality of K paths, the computing system comprising:
 a received input particle stored within the computing system;
 a new K node built in accordance with said received input particle, said new K node recording said received input particle in said interlocking trees datastore; and
 a locked node wherein said locked node is locked in accordance with said building of said new K node;
 wherein the interlocking trees datastore comprising root nodes and non-root nodes using digitally encoded data stored within the attached storage medium being organized into a plurality of trees comprising connected K paths;
 the new K node of the interlocking trees datastore comprises:
  a first pointer comprising a Case pointer pointing to a previous node;
  a second pointer comprising a Result pointer pointing to an elemental root node;
  a third pointer comprising an asCase List pointer pointing to a list of the subcomponent nodes or end product nodes for which the new K node is the Case node; and
  a forth pointer comprising an asResultList pointer pointing to a list of subcomponent nodes or end product nodes for which the new K node is the Result node; and
 the plurality of connected K paths of the interlocking trees datastore having a plurality of K paths comprises:
  a first K path of a first tree of the interlocking trees datastore, the first K path comprising a primary root node linked to a subcomponent node with a first Case link, the subcomponent node linked to an end product node with a second Case link; and
  a second K path of a second tree of the interlocking trees datastore comprising an elemental root node linked to the subcomponent node with a Result link, such that a pointer to the elemental root node comprises the result entry of the subcomponent node and an asResult list of the elemental root node is updated to include the subcomponent node.

18. The computing system for recording information in an interlocking trees datastore of claim 17, wherein the attached storage medium comprises random access memory coupled to the programmable processor.

19. The computing system for recording information in an interlocking trees datastore of claim 17, further comprising a Case bi-directional link between said locked Case node and said new K node wherein said Case bi-directional link is completed while said locked Case node is locked and said locked node comprises the Case node of said new K node.

20. The computing system for recording information in an interlocking trees datastore of claim 19, further comprising a pointer to said new K node added to an asCase list of said locked Case node.

21. The computing system for recording information in an interlocking trees datastore of claim 20, wherein said locked node is locked only while adding said pointer to the new K node to said asCase list of said locked Case node.

22. The computing system for recording information in an interlocking trees datastore of claim 17, wherein said locked node comprises a Result node of said new K node.

23. The computing system for recording information in an interlocking trees datastore of claim 22, further comprising a pointer to said new K node added to an asResult list of said locked Result node while said Result node is locked.

24. The computing system for recording information in an interlocking trees datastore of claim 23, wherein said locked Result node is locked only while adding said pointer to said new K node to said asResult list of said locked Result node.

25. The computing system for recording information in an interlocking trees datastore of claim 17, further comprising a memory location of a Case node and a memory location of a Result node associated with said new K node.

26. The computing system for recording information in an interlocking trees datastore of claim 25, wherein said locked node is locked after said associating of said memory locations with said new K node.

27. The computing system for recording information in an interlocking trees datastore of claim 26, wherein said locked node is said Case node and said new K node is added to the asCase list of said locked Case node while said locked Case node is locked.

28. The computing system for recording information in an interlocking trees datastore of claim 27, where said Result node is locked after locking said locked Case node and said new K node is added to the asResult list of said locked Result node while said locked Result node is locked.

29. The computing system for recording information in an interlocking trees datastore of claim 27, wherein said Result node is locked before locking said Case node and said new K node is added to the asResult list of said locked Result node while said locked Result node is locked.

30. The computing system for recording information in an interlocking trees datastore of claim 27, wherein said Result node is locked while said Case node is locked and said new K node is added to the asCase list of said locked node while said Case node is locked.

31. The computing system for recording information in an interlocking trees datastore of claim 17, wherein said new K node has a new node count and said new node count is initialized.

32. The computing system for recording information in an interlocking trees datastore of claim 17, wherein said new K node is built in accordance with a determination that a new sequence has been encountered.

* * * * *